(12) United States Patent
Haviv et al.

(10) Patent No.: US 8,468,605 B2
(45) Date of Patent: Jun. 18, 2013

(54) IDENTIFYING SECURITY VULNERABILITY IN COMPUTER SOFTWARE

(75) Inventors: Yinnon A. Haviv, Beerotaim (IL); Roee Hay, Haifa (IL); Marco Pistoia, Amawalk, NY (US); Adi Sharabani, Ramat Gan (IL); Takaaki Tateishi, Kanagawa-ken (JP); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/627,351

(22) Filed: Nov. 30, 2009

(65) Prior Publication Data

US 2011/0131656 A1    Jun. 2, 2011

(51) Int. Cl.
- *G06F 12/14* (2006.01)
- *G06F 12/16* (2006.01)
- *G06F 11/00* (2006.01)
- *G08B 23/00* (2006.01)
- *G06F 11/30* (2006.01)
- *G06F 9/44* (2006.01)

(52) U.S. Cl.
USPC .................... 726/25; 713/187; 717/127

(58) Field of Classification Search
USPC ................ 726/22–25; 717/124–133
See application file for complete search history.

(56) References Cited

U.S. PATENT DOCUMENTS

| | | | |
|---|---|---|---|
| 7,058,805 B2 | 6/2006 | Sibert | |
| 7,240,332 B2 * | 7/2007 | Berg et al. | 717/126 |
| 7,392,545 B1 | 6/2008 | Weber et al. | |
| 7,398,516 B2 * | 7/2008 | Berg et al. | 717/126 |
| 7,398,517 B2 * | 7/2008 | Berg et al. | 717/126 |
| 7,454,797 B2 | 11/2008 | Zhu et al. | |
| 7,530,101 B2 | 5/2009 | Gallo et al. | |
| 7,530,107 B1 | 5/2009 | Ono et al. | |
| 7,617,489 B2 * | 11/2009 | Peyton et al. | 717/133 |
| 7,661,097 B2 * | 2/2010 | Mukkavilli | 717/143 |
| 7,849,509 B2 * | 12/2010 | Venkatapathy et al. | 726/25 |

(Continued)

FOREIGN PATENT DOCUMENTS

| | | |
|---|---|---|
| JP | 2007052625 A | 3/2007 |
| JP | 2008060745 | 3/2008 |
| WO | WO2008047351 A2 | 4/2008 |
| WO | 2008071795 | 6/2008 |

OTHER PUBLICATIONS

James Harvey, "A Static Secure Flow Analyzer for a Sub-set of Java", US Naval Post-Graduate School, Mar. 1998. Available at http://oai.dtic.mil/oai/oai?verb=getRecord&metadataPrefix=html&identifier=ADA343709 See Abstract: p. 6.

(Continued)

*Primary Examiner* — Christian Laforgia
(74) *Attorney, Agent, or Firm* — Cantor Colburn LLP; Prentiss Johnson

(57) ABSTRACT

Identifying a security vulnerability in a computer software application by identifying at least one source in a computer software application, identifying at least one sink in the computer software application, identifying at least one input to any of the sinks, determining whether the input derives its value directly or indirectly from any of the sources, determining a set of possible values for the input, and identifying a security vulnerability where the set of possible values for the input does not match a predefined specification of legal values associated with the sink input.

10 Claims, 3 Drawing Sheets

U.S. PATENT DOCUMENTS

| | | | |
|---|---|---|---|
| 7,853,987 B2 | 12/2010 | Balasubramanian et al. | |
| 7,937,692 B2* | 5/2011 | Drepper | 717/140 |
| 7,975,257 B2* | 7/2011 | Fanning et al. | 717/124 |
| 7,987,451 B1* | 7/2011 | Dalcher | 717/126 |
| 8,166,532 B2 | 4/2012 | Chowdhury et al. | |
| 2004/0260940 A1* | 12/2004 | Berg et al. | 713/200 |
| 2005/0108562 A1* | 5/2005 | Khazan et al. | 713/200 |
| 2006/0150160 A1* | 7/2006 | Taft et al. | 717/126 |
| 2006/0277539 A1 | 12/2006 | Amarasinghe et al. | |
| 2007/0016894 A1 | 1/2007 | Sreedhar | |
| 2007/0083933 A1* | 4/2007 | Venkatapathy et al. | 726/25 |
| 2007/0088740 A1* | 4/2007 | Davies et al. | 707/103 R |
| 2007/0150869 A1* | 6/2007 | Tateishi et al. | 717/127 |
| 2008/0148061 A1 | 6/2008 | Jin et al. | |
| 2008/0184208 A1 | 7/2008 | Sreedhar et al. | |
| 2008/0244536 A1* | 10/2008 | Farchi et al. | 717/130 |
| 2008/0270993 A1* | 10/2008 | Tateishi et al. | 717/127 |
| 2010/0043048 A1 | 2/2010 | Dolby et al. | |
| 2010/0333201 A1 | 12/2010 | Haviv et al. | |
| 2011/0072517 A1* | 3/2011 | Tripp | 726/25 |
| 2011/0078794 A1 | 3/2011 | Manni et al. | |
| 2011/0087892 A1* | 4/2011 | Haviv et al. | 713/187 |
| 2011/0131656 A1 | 6/2011 | Haviv et al. | |
| 2011/0321016 A1 | 12/2011 | Haviv et al. | |

OTHER PUBLICATIONS

Geay et al., "Modular String-Sensitive Permission Analysis with Demand-Driven Precision", ICSE' 09, May 16-24, 2009, pp. 177-187.

Wasserman, G., et al., "Sound and Precise Analysis of Web Applications for Injection Vulnerabilities," SINGPLAN Notices, vol. 42, No. 6 (Jun. 2007), pp. 32-41.

Pietraszek et al., "Defending Against Injection Attacks Through Context-Sensitive String Evaluation," Lecture Notes in Computer Science (including subseries Lecture Notes in Artificial Intelligence and Lecture Notes in Bioinformatics). vol. 3858 LNCS (2006) pp. 124-145. Recent Advances in Intrusion Detection—8th International Symposium, RAID (2005), Revised papers.

Benjamin Livshits, "Improving Software Security with Precise Static and Runtime Analysis," Dissertation submitted to the department of computer science and the committee on graduate studies of Stanford University in partial fulfillment of the requirements for the degree of doctor of philosophy, Nov. 2006, 250 pages.

Christensen et al., "Precise Analysis of String Expressions," SAS 2003, LNCS 2694, pp. 1-18.

Minamide, Y., "Static Approximation of Dynamically Generated Web Pages," WWW 2005, May 10-14, 2005, pp. 423-441.

Engelfriet et al., "MSO definable string transductions and two-way finite state transducers," Technical Report 98-13, Dec. 1998, pp. 1-62.

Moller et al., "The Pointer Assertion Logic Engine," PLDI 2001, Proceedings of the ACM SIGPLAN 2001 Conference on Programming Language Design and Implementation, pp. 1-11.

James Harvey, "A Static Secure Flow Analyzer for a Sub-set of Java", US Naval Post-Graduate School, Mar. 1998, 98 pages.

Scott et al., "Specifying and Enforcing Application-Level Web Security Policies", IEEE Transactions on Knowledge and Data Engineering, vol. 15, No. 4, 2003, pp. 771-783. http://www.2.computer.org/portal/web/csdl/doi/10.1109/TKDE.2003.1208998.

* cited by examiner

IDENTIFYING SECURITY VULNERABILITY IN COMPUTER SOFTWARE

FIELD OF THE INVENTION

The invention relates to computer software analysis and testing in general, and more particularly to identifying security vulnerabilities in computer software.

BACKGROUND OF THE INVENTION

Static information flow analysis tools, referred to herein as "static analyzers," are well known tools that provide information about computer software while applying only static considerations (i.e., without executing a computer software application). In one type of static analysis, information flows are traced within a computer software application from sources, being application programming interfaces (API) that introduce "untrusted" input into a program, such as user input, to sinks, being security-sensitive operations, and such flows are identified as security vulnerabilities that may require further analysis by a software developer and possibly corrective action. However, many such information flows may encounter one or more points within the application, referred to herein as "downgraders," that validate and/or sanitize data, and particularly data that are input into the application from sources that are external to the application. These downgraders ensure that the data do not contain illegal characters or are not represented in an illegal format, both common tactics used in malicious attacks.

SUMMARY OF THE INVENTION

The invention in embodiments thereof discloses novel systems, methods, and computer program products for identifying security vulnerabilities in a computer software application without requiring downgraders to be specified or segregated.

In one embodiment of the present invention, a method is provided for identifying a security vulnerability in a computer software application, the method including identifying at least one source in a computer software application, identifying at least one sink in the computer software application, identifying at least one input to any of the sinks, determining whether the input derives its value directly or indirectly from any of the sources, determining a set of possible values for the input, and identifying a security vulnerability where the set of possible values for the input does not match a predefined specification of legal values associated with the sink input.

In another embodiment of the present invention, the method further includes providing a notification of the security vulnerability.

In another embodiment of the present invention, a system is provided for identifying a security vulnerability in a computer software application, the system including a static analyzer configured to statically analyze instructions of a computer software application to identify information flows within the application, a sink analyzer configured to identify at least one input to at least one sink within the application and determine whether any of the sink inputs derives its value directly or indirectly from any source within the application, a value set determiner configured to determine a set of possible values for any of the sink inputs that derives its value directly or indirectly from any of the sources, a value validator configured to compare the set of possible values for the sink input with a predefined specification of legal values associated with the sink input and provide a notification of a security vulnerability associated with the sink input if the set of possible values contains at least one value that does not match the predefined specification of legal values.

In another embodiment of the present invention, the instructions are in the form of either of source code and bytecode.

In another embodiment of the present invention, the static analyzer is configured to identify any of the sources and sinks.

In another embodiment of the present invention, the value validator is configured to provide the notification via a display of a computer.

In another embodiment of the present invention, a computer program product is provided for identifying a security vulnerability in a computer software application, the computer program product including a computer readable medium, computer program instructions operative to identify at least one source in a computer software application, identify at least one sink in the computer software application, identify at least one input to any of the sinks, determine whether the input derives its value directly or indirectly from any of the sources, determine a set of possible values for the input, and identify a security vulnerability where the set of possible values for the input does not match a predefined specification of legal values associated with the sink input, and where the program instructions are stored on the computer readable medium.

In another embodiment of the present invention, the computer program instructions are operative to provide a notification of the security vulnerability.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
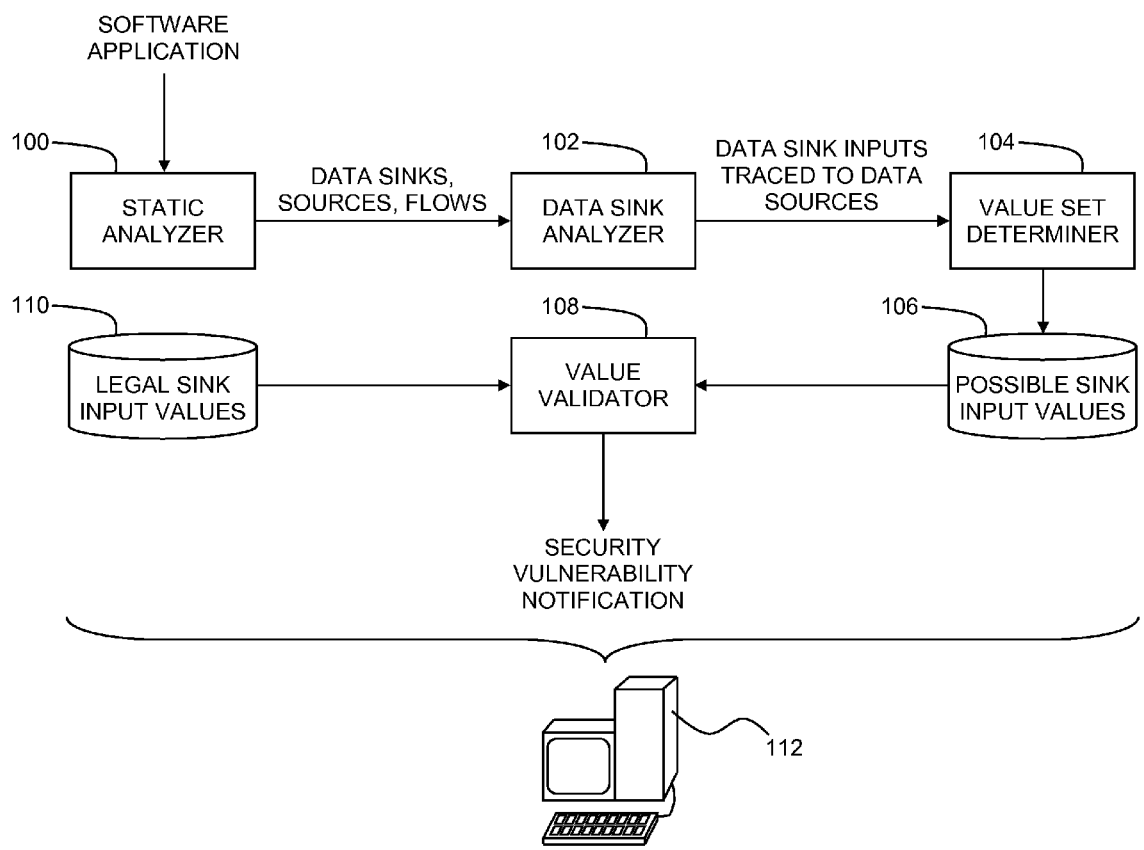
FIG. 1 is a simplified conceptual illustration of a system for identifying security vulnerabilities in a computer software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations an embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for identifying security vulnerabilities in a computer software application without specifying downgraders, constructed and operative in accordance with an embodiment of the invention. In the system of FIG. 1, a static analyzer 100 uses conventional methods to statically analyze the instructions of a computer software application, such as where the instructions are in the form of source code or bytecode, to identify information flows within the application. Sources and sinks may also be identified within the application by static analyzer 100 using conventional techniques, or may be manually identified and made known as such to static analyzer 100. A sink analyzer 102 identifies inputs to any of the sinks and determines whether any of the sink inputs derive their values directly or indirectly from any of the sources. For any sink input that derives its value directly or indirectly from a source, a value set determiner 104 determines a set of possible values 106 for the input using any suitable technique. One method for determining a set of possible values for a sink input is described in U.S. patent application Ser. No. 11/960,153 to Ono, et al., entitled "Systems, Methods and Computer Program Products for String Analysis with Security Labels for Vulnerability Detection," issued as U.S. Pat. No. 7,530,107. A value validator 108 compares the set of possible values 106 for a sink input with a predefined specification of legal values 110 associated with the sink input. If the set of possible values contains one or more values that do not match the predefined specification of legal values, value validator 108 preferably provides a notification of a security vulnerability associated with the sink input, such as via a display of a computer 112.

Figure 2:
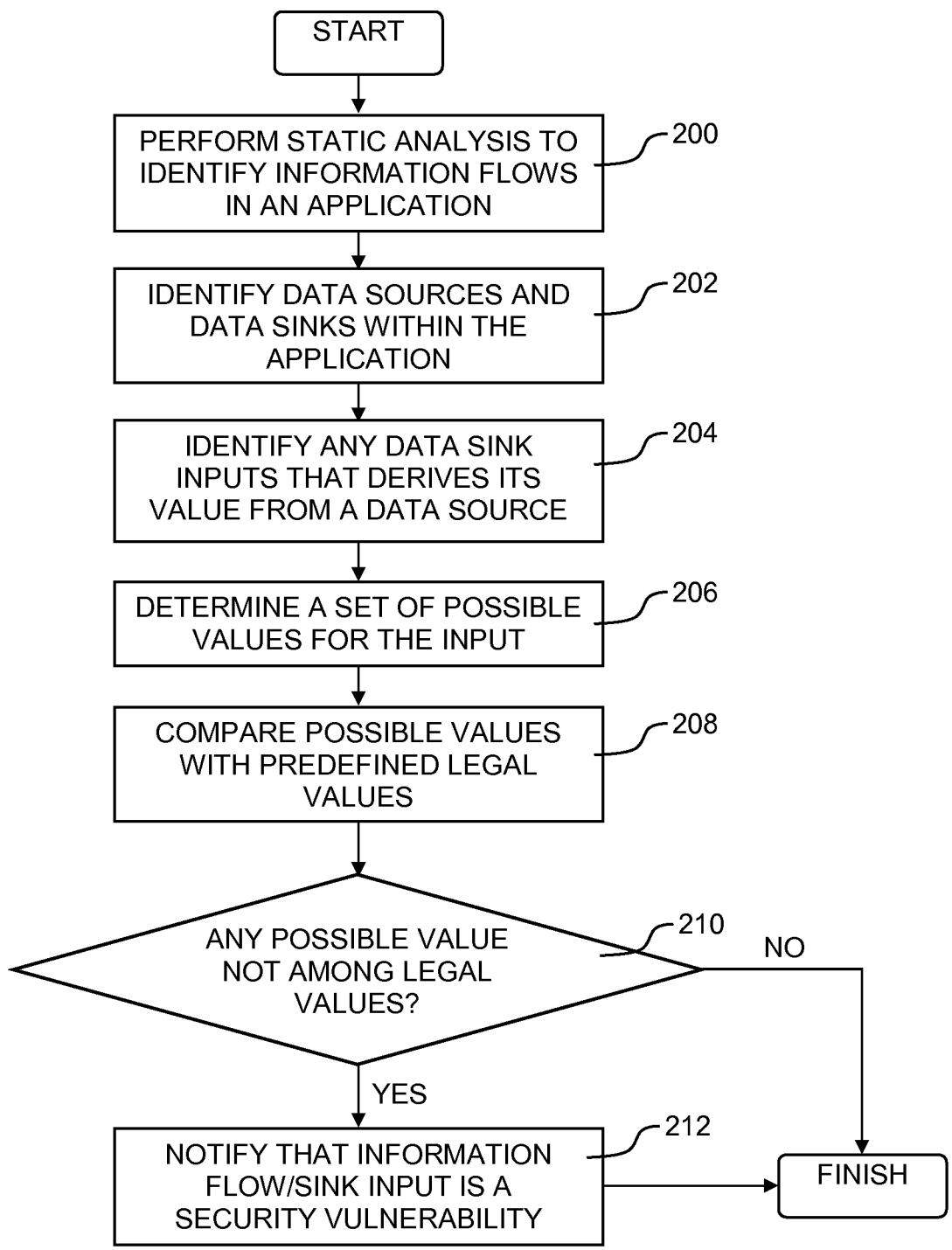
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 static analysis is performed on the instructions of a computer software application to identify information flows within the application (step 200). Sources and sinks are also identified within the application or are manually identified (step 202). Inputs to any of the sinks are identified, and it is determined whether any of the sink inputs derive their values directly or indirectly from any of the sources (step 204). For any sink input that derives its value directly or indirectly from a source, a set of possible values for the input is determined (step 206). The set of possible values for a sink input is compared with a predefined specification of legal values associated with the sink input (step 208). If the set of possible values contains one or more values that do not match the predefined specification of legal values (step 210), a notification is provided of a security vulnerability associated with the sink input (step 212).

It will be appreciated that any aspect of the invention described hereinabove may be implemented as a computer program product embodied in a computer-readable medium, such as in the form of computer program instructions stored on magnetic or optical storage media or embedded within computer hardware, and may be executed by or otherwise accessible to a computer 112 (FIG. 1).

The system and method of FIGS. 1 and 2 may be understood within the context of the following exemplary scenario concerning a Java™ application running under the Apache™ environment in which an information flow between a source, such as a javax.servlet.http.HttpServletRequest.getParameter and a sink, such as a java.io. PrintWriter.println, is identified. The information flow passes through the following calls in which org.mortbay.util.UrlEncoded.encode and org.apache.util.URLUtil.URLEncode are downgraders. An input to the sink is identified using conventional static analysis techniques as deriving its value directly or indirectly from the source. A set of possible values for the sink input is determined using any suitable technique, such as string analysis mentioned hereinabove. Thus, for example, it is determined that possible values for the sink input are "<script>alert('1')</script>", "abc", and "def". The set of possible values for the sink input is compared with a predefined specification of legal values associated with the sink input which indicates that .*(\x22|\x3c|\x3e).* are legal values for the sink input. Since the set of possible values contains one or more values that do not match the predefined specification of legal values, where in this example the value "<script>alert('1')</script>" is in the set of possible values and also not in the set of legal values, the information flow is preferably reported as a security vulnerability.

Figure 3:
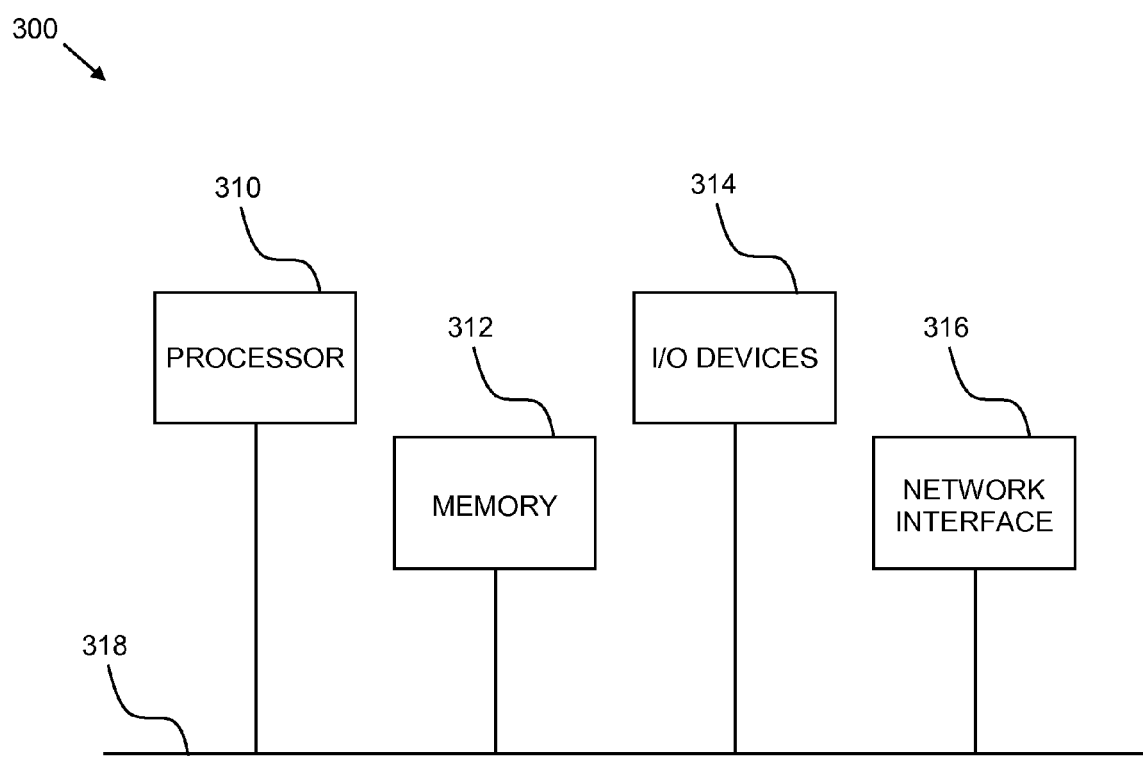
FIG. 3 is a simplified block diagram illustrating an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of an embodiment of the invention (e.g., components/methodologies described in the context of FIGS. 1-2) may be implemented.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for identifying a security vulnerability pertaining to a processor executing a computer software application comprising:
    identifying a source in said computer software application providing information;
    identifying a sink in said computer software application processing information, wherein said sink includes one or more inputs;
    identifying an input to said sink;
    determining whether said input derives its value directly or indirectly from said source;
    determining a set of possible values for said input in response to said value of said input being derived from said source;
    comparing the set of possible values to a predefined specification of legal values associated with said input to said sink; and
    identifying a security vulnerability pertaining to a processor executing the computer software application in response to one or more values of said set of possible values for said input not being included within said predefined specification of legal values associated with said input to said sink.

2. A computer-implemented method according to claim further comprising providing a notification of said security vulnerability.

3. A computer-implemented method according to claim 1 wherein said computer software application includes instructions in the form of one of source code and bytecode.

4. A system for identifying a security vulnerability in a computer software application comprising:
    a computing system including a processor configured to:
        statically analyze instructions of said computer software application to identify information flows within said computer software application;
        identify an input to a sink within said computer software application and determine whether an input to said sink derives its value directly or indirectly from a source within said computer software application;

determine a set of possible values for said input in response to said value of said input being derived from said source; and compare said set of possible values for said input with a predefined specification of legal values associated with said input to said sink and provide a notification of a security vulnerability associated with said input in response to one or more values of said set of possible values for said input not being included within said predefined specification of legal values.

5. A system according to claim 4 wherein said instructions are in the form of one of source code and bytecode.

6. A system according to claim 4 wherein said processor is further configured to identify said source and sink.

7. A system according to claim 4 wherein said processor is further configured to provide said notification via a display of a computer.

8. A computer program product for identifying a security vulnerability in a computer software application comprising:

a computer readable memory hardware device having computer readable program code stored thereon, the computer readable program code comprising computer program instructions operative to:

identify a source in said computer software application providing information;

identify a sink in said computer software application processing information, wherein said sink includes one or more inputs;

identify an input to said sink;

determine whether said input derives its value directly or indirectly from said source;

determine a set of possible values for said input in response to said value of said input being derived from said source;

compare the set of possible values to a predefined specification of legal values associated with said input to said sink; and identify a security vulnerability in response to one or more values of said set of possible values for said input not being included within said predefined specification of legal values associated with said input to said sink.

9. A computer program product according to claim 8 further comprising computer program instructions operative to provide a notification of said security vulnerability.

10. A computer program product according to claim 8 wherein said computer software application includes instructions in the form of one of source code and bytecode.

* * * * *